UNITED STATES PATENT OFFICE.

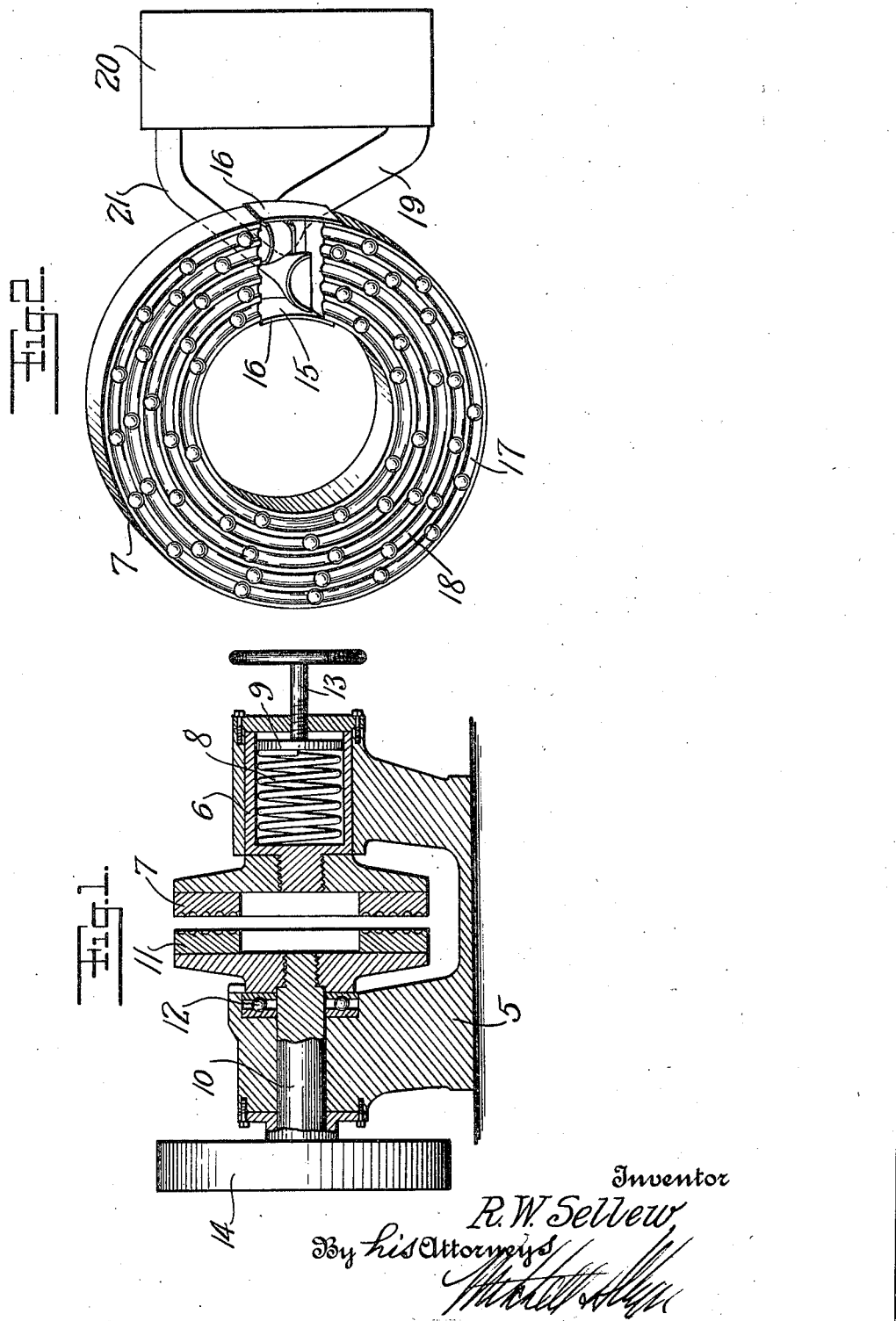

ROLAND WINCHESTER SELLEW, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-LAPPING MACHINE.

1,418,887.   Specification of Letters Patent.   Patented June 6, 1922.

Application filed October 15, 1920. Serial No. 417,207.

*To all whom it may concern:*

Be it known that I, ROLAND W. SELLEW, a citizen of the United States of America, residing at New Britain, Connecticut, have invented a new and useful Ball-Lapping Machine, of which the following is a specification.

My invention relates to a machine for grinding or lapping balls to be used in ball bearings.

It is usual in machines of this type to provide two relatively rotatable grinding disks having grooves therein to contain the balls. Machines have been constructed wherein the balls are taken from all of the grooves and then returned to the grooves after the balls have been more or less mixed. The object of such machines is to prevent the balls from being constantly ground or lapped in the same grooves by attempting to insure the entrance of the balls into different grooves to insure uniformity in the finished product. In machines where chance alone is depended upon to direct the balls from one groove into a different groove, it is obvious that the same ball will often return to the same groove it has just left, and the results sought to be attained will be defeated.

It is an object of my invention therefore to provide a machine in which the balls will be taken from one or more of the grooves and directed toward one or more other grooves in order to reduce to a minimum the possibility of having a ball constantly travel in one groove.

In machines as ordinarily constructed, it very often happens that the balls are ground or lapped off too much during the time that one or more of the balls are being gauged to determine if the proper size has been attained.

It is another object of my invention therefore to provide means whereby a greater length of time may be consumed in gauging one or more balls without the danger of grinding or lapping off too much from the remaining balls in the machine.

Other objects will appear as the specification proceeds.

In the preferred form of my invention there are provided two relatively rotatable grinding discs, one or both of which have grooves therein. A hopper is provided for receiving the balls from said grooves and permitting the re-distribution of the balls to the various grooves. A suitable conveyer is provided and receives balls from one or more of the grooves and directs the same back into the hopper and toward different grooves.

In the drawings which show merely a preferred form of my invention.

Figure 1, is a sectional view showing a pair of grinding discs and their mountings.

Fig. 2 is a partially diagrammatic view embodying features of my invention.

In said drawings, 5 represents a suitable frame or mounting. In the frame is slidably but non-rotatably mounted a shaft or sleeve 6 carrying one of the grinding discs 7. A coil spring 8 is mounted between the sleeve 6 and an adjustable abutment 9, whereby the disc 7 is resiliently urged toward the left as shown in Fig. 1. Rotatably mounted in the frame 5 is a shaft 10 carrying a complementary grinding disc 11 which is positioned opposite the disc 7 and the balls are ground or lapped between these two discs. A thrust bearing 12 is provided for the disc 11 and the degree of pressure to be exerted upon the balls between the discs may be varied by means of the screw 13.

The operation of the machine thus far described will be readily apparent. The disc 11 is rotated as by means of the pulley 14, and the balls will be ground or lapped between these two relatively rotatable discs 7 and 11.

In order to prevent the balls from remaining in the same grooves during the entire operation of lapping, I provide means for receiving the balls from one or more of the grooves in a disc, and returning the same to different grooves. In order to accomplish the foregoing result, a hopper is provided, which in the preferred form is formed by cutting away or recessing one of the discs to form the hopper indicated at 15. A suitable plate or plates 16 may be provided for enclosing the space formed by the recess in the disc in order to form a suitable hopper within the recess and between the complementary disc and the plate or plates.

Balls from one or more of the grooves are received by suitable means and directed into the hopper and preferably toward other grooves than those from which they were received. In the illustrative example shown, balls from the two outside grooves 17—18 are received by a suitable chute 19 and are conducted through any suitable or desired form of mechanical or gravity conveyor 20 back into the hopper as by means of the return chute 21. In the form shown, the balls taken from the two outer grooves are positively directed back into the hopper and toward grooves other than the two outer grooves. A machine embodying the novel features described will operate as follows:—

The balls between the discs and in the inner grooves upon reaching the hopper will tend to move outwardly due to centrifugal force as soon as they are released from the grooves. Therefore, balls which have been in the inner grooves upon reaching the hopper will naturally fall into an outer groove at the bottom the hopper. The balls from the inner grooves will progress outwardly between the discs until they reach one of the outer grooves, and these balls upon again reaching the hopper will be received by the chute and conveyor and positively directed back into the hopper, and toward the inner grooves. It will thus be seen that by my invention chance alone is not relied upon to shift the balls from one groove to another. The balls by reason of centrifugal action will progressively move to the outer grooves and upon reaching the outer grooves will be received and positively directed back toward the inner grooves.

Another feature of my invention resides in the fact that due to the size of the hopper and conveyor, the number of balls capable of being contained between the discs in the hopper and conveyor will be far in excess of the number of balls adapted to be contained between the discs alone. This feature is of great importance in that when only sufficient balls to fill the grooves between the discs are being lapped, and one or more balls are removed for the purpose of being gauged to see if the lapping operation is complete, the other balls remaining between the discs may be lapped off too much during the time consumed in gauging the few balls removed for that purpose. However, if say for example, twice as many balls are being lapped in the machine, it obviously requires twice the length of time for the balls to pass through the machine, and therefore twice the time may be consumed in gauging one or more balls to determine if the proper size has been attained, without too much being lapped off during the time consumed in gauging the balls which were removed for that purpose.

While I have shown one embodiment of my invention, I wish it to be understood that the embodiment shown is merely illustrative and that various changes and modifications may be made within the scope of the appended claims.

I claim:

1. In a ball lapping machine, a pair of relatively rotatable grinding discs, one of said discs having a plurality of annular grooves therein arranged one within the other, means for receiving balls from more than one of said grooves and positively directing them toward more than one of the others of said grooves.

2. In a ball lapping machine, a pair of relatively rotatable grinding discs, one of said discs having a plurality of annular grooves therein arranged one within the other, means for receiving balls from a plurality of the outer of said grooves and positively directing them toward a plurality of the inner of said grooves.

3. In a ball lapping machine, a pair of relatively rotatable grinding discs, one of which has a plurality of annular grooves therein arranged one within the other, one of said discs being recessed to provide a ball transfer space in communication with all of said grooves, means in one part of said space for receiving balls from one of said grooves, and means in another part of said space for transferring said balls to grooves other than those from which they were previously received.

4. In a ball lapping machine, a pair of relatively rotatable grinding discs one of which has a plurality of annular grooves therein arranged one within the other, one of said discs being cut away to form a space for the feeding and transfer of balls, means within said space for receiving balls forming a plurality of the outer grooves, and for transferring the same to another portion of said space and positively directing the same toward one or more of said inner grooves.

ROBERT WINCHESTER SELLEW.